(12) United States Patent
Kamrowski et al.

(10) Patent No.: US 10,654,315 B1
(45) Date of Patent: May 19, 2020

(54) ADJUSTABLE HEIGHT TABLE BASE WITH TRANSPORT MECHANISM

(71) Applicant: GF Health Products, Inc., Atlanta, GA (US)

(72) Inventors: Andrew Paul Kamrowski, Fond du Lac, WI (US); Kenneth Robert Kusel, Kohler, WI (US)

(73) Assignee: GF Health Products, Inc., Atlanta, GA (US)

( * ) Notice: Subject to any disclaimer, the term of this patent is extended or adjusted under 35 U.S.C. 154(b) by 0 days.

(21) Appl. No.: 16/437,798

(22) Filed: Jun. 11, 2019

Related U.S. Application Data

(60) Provisional application No. 62/693,809, filed on Jul. 3, 2018.

(51) Int. Cl.
| | | |
|---|---|---|
| *B60B 33/00* | (2006.01) | |
| *A47B 13/02* | (2006.01) | |
| *A47B 3/08* | (2006.01) | |

(52) U.S. Cl.
CPC ............ *B60B 33/0089* (2013.01); *A47B 3/08* (2013.01); *A47B 13/023* (2013.01); *B60B 33/0002* (2013.01); *A47B 2013/025* (2013.01)

(58) Field of Classification Search
CPC ... B60B 33/0089; B60B 33/0002; A47B 3/08; A47B 13/023; A47B 2013/025
See application file for complete search history.

(56) References Cited

U.S. PATENT DOCUMENTS

| | | | |
|---|---|---|---|
| 1,007,022 A | 10/1911 | Doll | |
| 1,016,324 A | 2/1912 | Dunn | |
| 1,019,302 A | 3/1912 | Butcher | |
| 1,520,116 A * | 12/1924 | Buchter | B60B 33/04 16/19 |
| 2,490,953 A * | 12/1949 | Eriksen | A47C 7/006 16/33 |
| 2,524,819 A * | 10/1950 | McKean | B60B 33/06 16/32 |

(Continued)

OTHER PUBLICATIONS

Space Tables, Inc., Space Tables 600 Series Demonstration, partial screenshots taken from https://www.youtube.com/watch?v=c4AT31zaW80 as viewed on Dec. 4, 2019 indicated as being uploaded Jul. 12, 2012. 10 pages of screenshots annotated with time in video.

*Primary Examiner* — Hanh V Tran
(74) *Attorney, Agent, or Firm* — Brannen Law Office, LLC

(57) ABSTRACT

The present invention relates to an adjustable height table base with a transport mechanism, and in particular to a transport mechanism selectably operable in a grounded position, a low transport position and a high transport position. The table has a base that is adjustable in length with a crank. A top is supported by a table frame, which allows the top to be locked in a horizontal or vertical position. Four legs can be provided each having a pad at a distal end. A transport mechanism is also provided. The transport mechanism has a caster assembly with four casters and has an extension assembly that is extendable along its longitudinal axis to move that table between the grounded position, low transport position and high transport position. The extension assembly is operable under force of gravity and used by lifting or tilting anywhere radially about the table at selected distances.

14 Claims, 19 Drawing Sheets

(56) References Cited

U.S. PATENT DOCUMENTS

| | | | | |
|---|---|---|---|---|
| 2,774,986 A * | 12/1956 | Moorehouse | A47C 7/006 | 16/34 |
| 2,788,219 A | 4/1957 | McClellan | | |
| 2,873,987 A * | 2/1959 | Larson | A47B 3/08 | 403/61 |
| 2,908,031 A * | 10/1959 | Millett | A47C 7/006 | 16/34 |
| 3,993,004 A * | 11/1976 | Alme | A47B 3/00 | 108/124 |
| 4,067,266 A | 1/1978 | Lafargue | | |
| 4,094,255 A * | 6/1978 | Zaccaria | A47B 13/023 | 108/150 |
| 4,518,142 A * | 5/1985 | Sulcek | A47B 91/02 | 248/188.2 |
| 4,828,208 A * | 5/1989 | Peterson | A47B 9/00 | 108/147 |
| 4,879,954 A * | 11/1989 | Sawamura | A47B 3/00 | 108/6 |
| 4,986,195 A * | 1/1991 | Diffrient | A47B 3/08 | 108/1 |
| 5,121,697 A * | 6/1992 | Baum | A47B 3/0803 | 108/124 |
| 5,365,862 A * | 11/1994 | Peterson | A47B 9/00 | 108/147 |
| 5,944,291 A * | 8/1999 | Kato | A47B 13/00 | 16/19 |
| 6,550,101 B2 * | 4/2003 | Plate | B60B 33/04 | 16/19 |
| 6,886,216 B2 * | 5/2005 | Graham | A47B 91/028 | 16/19 |
| 7,228,594 B2 * | 6/2007 | Smith | B60B 19/04 | 16/19 |
| 7,426,974 B1 * | 9/2008 | Yeghiayan | B66F 3/35 | 180/124 |
| 8,100,061 B2 * | 1/2012 | Hookway | A47B 23/046 | 108/26 |
| 9,144,300 B2 * | 9/2015 | Cotey | A47B 3/0815 | |
| 9,586,442 B2 | 3/2017 | Trickle | | |
| 2010/0300242 A1 * | 12/2010 | Rutz | A47B 3/08 | 74/527 |
| 2011/0290159 A1 * | 12/2011 | Saito | A47B 3/08 | 108/115 |
| 2013/0284076 A1 * | 10/2013 | Okuda | A47B 3/08 | 108/115 |
| 2015/0096477 A1 * | 4/2015 | Liu | A47B 3/0815 | 108/124 |
| 2016/0309888 A1 * | 10/2016 | Krusin | A47B 3/0809 | |
| 2017/0065074 A1 * | 3/2017 | Ilse | A47B 3/0803 | |

* cited by examiner

ADJUSTABLE HEIGHT TABLE BASE WITH TRANSPORT MECHANISM

This United States utility patent application claims priority on and the benefit of provisional application 62/693,809 filed Jul. 3, 2018, the entire contents of which are hereby incorporated herein by reference.

BACKGROUND OF THE INVENTION

1. Field of the Invention

The present invention relates to an adjustable height table base with a transport mechanism, and in particular to a transport mechanism selectably operable in a grounded position, a low transport position and a high transport position.

2. Description of the Related Art

Many tables exist. In a basic form, a stationary table has at least one vertical riser with a base that supports the top a distance above the floor. Transport of a basic table, if small enough, can be accomplished by one person who has to lift the table off of the ground and set it in the intended position. Often, multiple people are needed to move a table of any substantial size or weight.

Some tables have a transport mechanism that can be deployed so that the table is supported on casters for transport. One drawback with such an approach is that a user has to be oriented in a specific location to access the actuator. A second drawback is the possibility that the user is not able to understand or operate the mechanism.

Another attempt at a solution is found in U.S. Pat. No. 4,828,208 titled Vertically Adjustable Table with Retractable Caster Assembly. In this patent, a table is provided with a single retractable caster to facilitate manually transporting the table from one location to another. The retractable caster is located substantially directly below the center of gravity of the table, so that when the caster is extended to an "on" position, the table can be held in a generally poised condition over the caster wheel, and manually rolled across the floor. A pedestal-type base, having radially outwardly extending feet with glides provides outrigger support for the table during transport. The caster is shifted between the extended "on" position, and a retracted "off" position by simply tilting the table slightly about its base, such that a person having ordinary strength and dexterity can easily and safely move the table about a room without assistance. An institutional version of the table is designed for use in hospitals, nursing homes, and the like, and may include a vertically adjustable top to accommodate both ambulatory and wheelchair patients, as well as a raised, marginal, top edge that forms a spill guard with contrasting colors to facilitate use by the visually impaired. While such a design may be useful for its intended purposes, it does not teach, show or suggest the present invention.

Thus, there exists a need for an adjustable height table base with a transport mechanism that solves these and other problems.

SUMMARY OF THE INVENTION

The present invention relates to an adjustable height table base with a transport mechanism, and in particular to a transport mechanism selectably operable in a grounded position, a low transport position and a high transport position. The table has a base that is adjustable in length with a crank. A top is supported by a table frame, which allows the top to be locked in a horizontal or vertical position. Four legs can be provided each having a pad at a distal end. A transport mechanism is also provided. The transport mechanism has a caster assembly with four casters and has an extension assembly that is extendable along its longitudinal axis to move that table between the grounded position, low transport position and high transport position. The extension assembly is operable under force of gravity and used by lifting or tilting anywhere radially about the table at selected distances.

According to one advantage of the present invention, the table top is supported by a table frame that is lockable in a vertical (vertical being generally vertical, not necessarily perpendicular to horizontal) position and in a horizontal position. The vertical position is useful when the table is being stored.

According to another advantage of the present invention, a transport mechanism is provided that is operable under the force of gravity. This is advantageous as no tools are required to move the table from a grounded position to a transport position.

According to a further advantage of the present invention, the transport mechanism is generally mounted to the base along the base center of gravity so that a caster assembly is positioned relatively neutral with respect to the base.

According to a still further advantage of the present invention, the caster assembly can be moved to a low transport position (low roll clearance) or a high transport position (high roll clearance) to accommodate the flooring conditions such as hard surface or carpet. In this regard, the table can be positioned only as high as necessary based on the conditions.

According to a still further advantage yet of the present invention, multiple casters are present, preferably at least three. In this regard, the table can be supported by the casters when in a transport position. This minimizes risks or jarring, scratching or marking that can occur when a pad contacts the flooring surface.

According to a still further advantage yet of the present invention, the table can be moved when the top is in either the vertical or horizontal position. Further, the transport mechanism can be moved between positions when the table is in either the vertical or horizontal positions.

According to a still further advantage yet of the present invention, the casters can be raised and lowered from all points radially about the table perimeter.

According to a still further advantage yet of the present invention, the transport mechanism can be offered as either an OEM component or retrofitted to existing tables.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
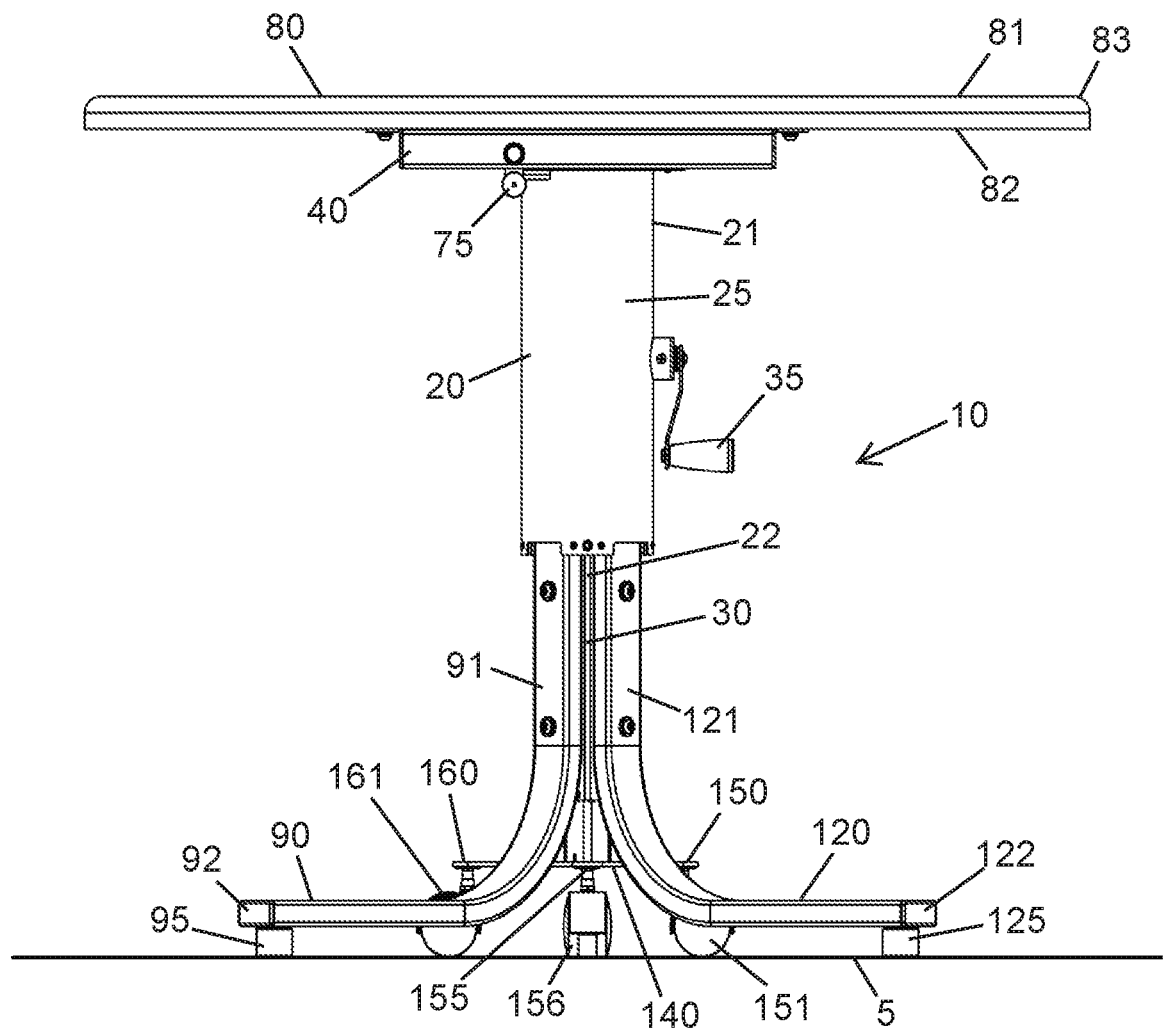
FIG. 1 is a side view of a table in a grounded position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

A preferred embodiment of a table 10 the present invention is illustrated in FIGS. 1-26. The table 10 can be used on many types of surfaces 5. One surface is a hard surface, such as wood, tile, concrete or plastic. Another surface is a soft surface, such as carpet. The present invention can be used with multiple surface types, and is not limited to use with any particular surface.

The table 10 has a base 20, a table frame 40, a table top 80, a plurality of legs 90, 100, 110 and 120 (for example) and a transport mechanism 130. Each of these will be described in detail below.

The base 20 has a top 21 and a bottom 22. An upper piece 25 is at the top 21 and a lower piece 30 is at the bottom 22. The upper piece 25 and lower piece 30 are movable relative to each other along a base longitudinal axis. Once preferred adjustment mechanism is a crank 35 that can turn a gear 36 relative to a threaded shaft 37 that is aligned along the base longitudinal axis. The position of the gear 36 relative to the crank 35 and threaded shaft 37.

The table frame 40 has a first section 50 and a second section 60. The first section 50 has a first arm 51, a second arm 52 and a third arm 53. The first arm 51 is preferably parallel to the second arm 52. The third arm 53 is preferably perpendicular to both the first arm 51 and the second arm 52. The third arm 53 has a slot 54 there through. The second section 60 has a first arm 61, a second arm 62, a third arm 63, a fourth arm 64 and a cross piece 65. The first arm 61 is preferably parallel to the second arm 62. The third arm 63 is preferably parallel to the fourth arm 64. The cross piece 65 is preferably parallel to the third arm 63 and fourth arm 64. A lever 70 is attached to the cross piece 65. A spring 71 biases the lever 70 to a first position within a slot 66 formed through the cross piece 65. A user can overcome the spring force to move the lever to a second position on the opposite end of the slot 66. The spring 71 biases the lever back to the first position when the user releases the lever. The first section 50 is pivotally connected to the second section 60. Specifically, the first arm 51 of the first section 50 is pivotally connected to the first arm 61 of the second section 60 and the second arm 52 of the first section 50 is pivotally connected to the second arm 62 of the second section 60.

The table has a table top 80. The table top 80 has an upper surface 81 and a lower surface 82. The table top 80 also has a perimeter 83. It is appreciated that while a round top 80 is illustrated, that the top 83 could have any shape, including but not limited to square, rectangular, polygonal, oval or otherwise, without departing from the broad aspects of the present invention.

The first section 50 of the table frame 40 is secured in a fixed manner to the top 21 of the base 20. The third and fourth arms 63 and 64 of the second section 60 of the table frame 60 is secured in a fixed manner to the lower surface 82 of the table top 80. The table top 80 is accordingly pivotally connected to the base 20 via the table frame 40. The table top 80 can be held in a horizontal position wherein the upper surface 81 can be held generally parallel to the floor. The table top 80 can also be held in a vertical position. It is understood that a vertical position does not require that the upper surface be perpendicular to the floor 5. Indeed, when viewing the figures, it is seen that the table top is at an angle of approximately 83 degrees with respect to the floor. Yet, for purposes of the present invention, this orientation is considered a vertical position.

The table top 80 is lockable in the horizontal position as the lever 70 enters an open top of the slot 54 in the third arm 53 of the first section. The spring 71 biases the lever 70 to a fully inserted position within the slot to prevent pivotal movement of the table top 80 relative to the base 20. A user can pivot the lever 70 to a position wherein it can exit the open slot 54 allowing the table top 80 to tilt or pivot to the vertical position. A lock 75 can lock or fix the table top in the vertical position. The lock 75 has an indexing spring plunger that is used to lock the table top in the vertical position. The spring plunger is fixed to the pivot mechanism of the table base. When the table top is being tilted the spring plunger is compressed by the angled surface in the hinge plate until the spring plunger locks into a slot also located on the hinge plate. This locks the table top in the vertical position. The lock is unlocked by pulling on a knob on the spring plunger to remove it from the slot. This allows the table top to be tilted back to the horizontal position. The table top 80 is shown locked in the vertical position in FIGS. 9 and 10.

A plurality of legs is provided as seen in FIGS. 11 and 17-20. In a preferred embodiment, there are four legs 90, 100, 110 and 120. Yet, it is appreciated that there could be more or fewer legs without departing from the broad aspects of the present invention so long as the table can stand upright when supported by the legs.

Leg 90 has a proximal end 91 and a distal end 92. The proximal end is connected to the bottom 22 of the base. A pad 95 is at the distal end 92 of the leg 90.

Leg 100 has a proximal end 101 and a distal end 102. The proximal end is connected to the bottom 22 of the base. A pad 105 is at the distal end 102 of the leg 100.

Leg 110 has a proximal end 111 and a distal end 112. The proximal end is connected to the bottom 22 of the base. A pad 115 is at the distal end 112 of the leg 110.

Leg 120 has a proximal end 121 and a distal end 122. The proximal end is connected to the bottom 22 of the base. A pad 125 is at the distal end 122 of the leg 120.

The legs 90, 100, 110 and 120 are preferably equidistantly about the base 20. In this regard, each leg is preferably radially offset approximately 90 degrees from each other. It is appreciated that different spacing would be provided when a different number of legs are utilized.

The table 10 can have a grounded position wherein the weight of the table is supported by the legs 90, 100, 110 and 120, and directly by pads 95, 105, 115 and 125, on the surface 5. In the grounded position, the table top can be vertically separated from the surface by a variable distance. In a preferred, embodiment, the crank 35 can but used to adjust the table height between approximately 27.5 inches and 33.25 inches. The crank can be turned clockwise to raise the table top height and counter-clockwise to lower the table top height. It is appreciated that alternative heights could be used without departing from the broad aspects of the present invention.

A transport mechanism 130 is also provided having a caster assembly 140 and an extension assembly 180. The transport mechanism 130 is shown generally in FIGS. 12-16.

The caster assembly 140 has a top 141 and a bottom 142. A caster support 150 is provided supporting a caster 151. A second caster support 155 is provided supporting a caster 156. A third caster support 160 is provided supporting a caster 161. A fourth caster support 165 is provided supporting a caster 166. Four caster supports are illustrated and is the preferred number of supports to be used with a table having four legs so that each support can be between two legs. It is seen that caster support 160 is longer than the other supports for stability of the table 10 when the table top 80 is in the vertical position to support the weight of the offset table top.

In addition to being seen in FIGS. 12-16, the extension assembly is shown in isolation in FIGS. 22-26. The extension assembly 180 has two ends 181 and 182.

As seen in FIGS. 22 and 24-26, a first piece 190 is at the first end 181. The first piece 190 has a top 191 with a hole 192. It also has a bottom 195 with rod 196 and a guide 197. The guide 197 can have a slot and a spring. The rod 196 is movable within the guide 197. The spring biases the rod to one side of the guide. The spring cannot move the rod laterally when it is within the slot. A second piece 210 is at the second end 182 of the extension assembly 180. The second piece 210 has a top 211 and a bottom 215. A hole 216 is at the bottom 215. The second piece also has a rail 220. The rail 220 has a lower vertical slot 221, a lower angled slot 222, an upper angled slot 223 and an upper vertical slot 224.

Figures 22, 23, 24:
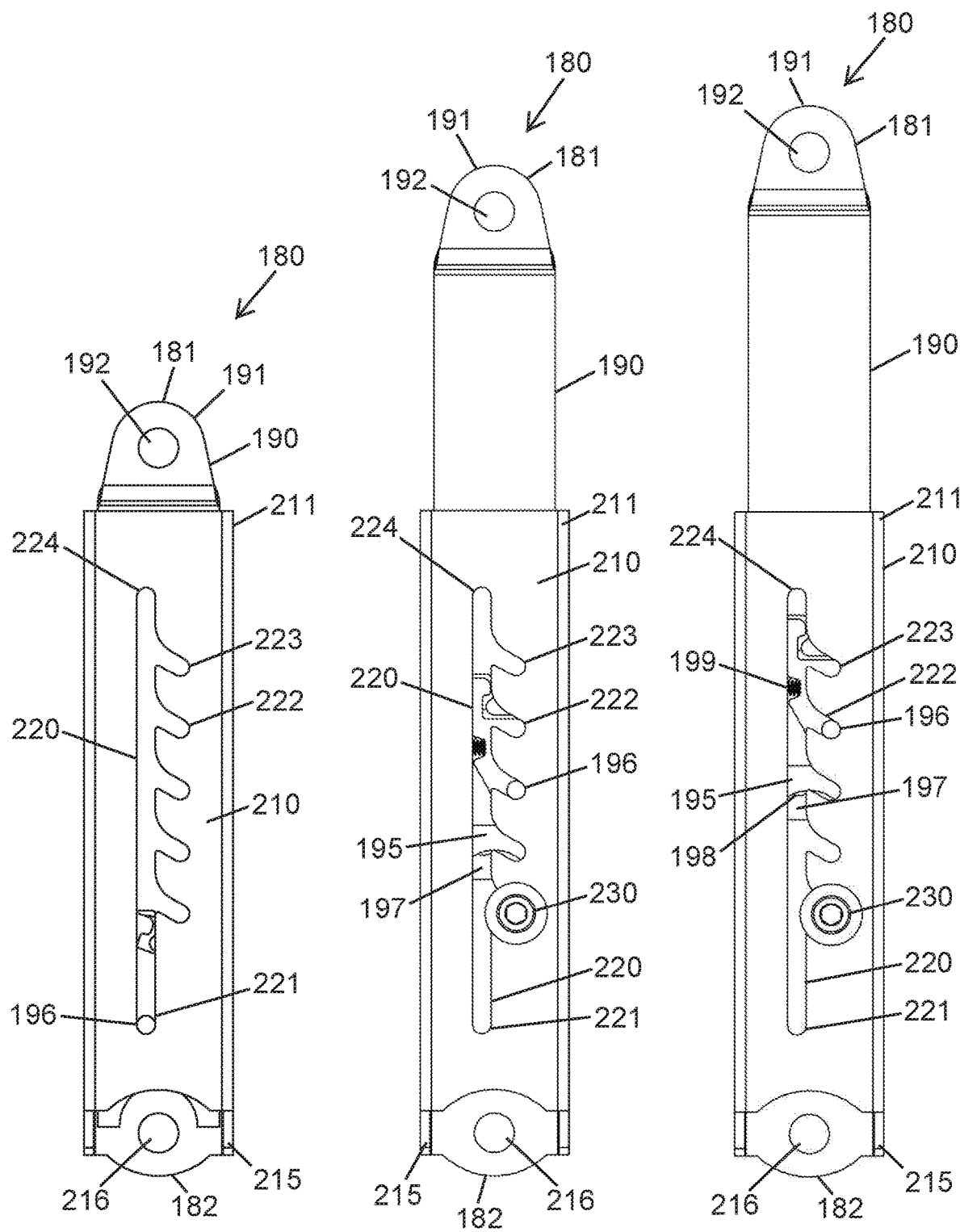
FIG. 22 is an isolation view of the extension assembly with the rod shown in the lower vertical slot allowing the table to be in the grounded position.
FIG. 23 is similar to FIG. 22, but shows an optional stop bolt so that a lowest angled slot allows the table to be in the grounded position.
FIG. 24 is similar to FIG. 22, but shows the bar in a lower angled slot allowing the table to be in the low transport position.
Figure 25:
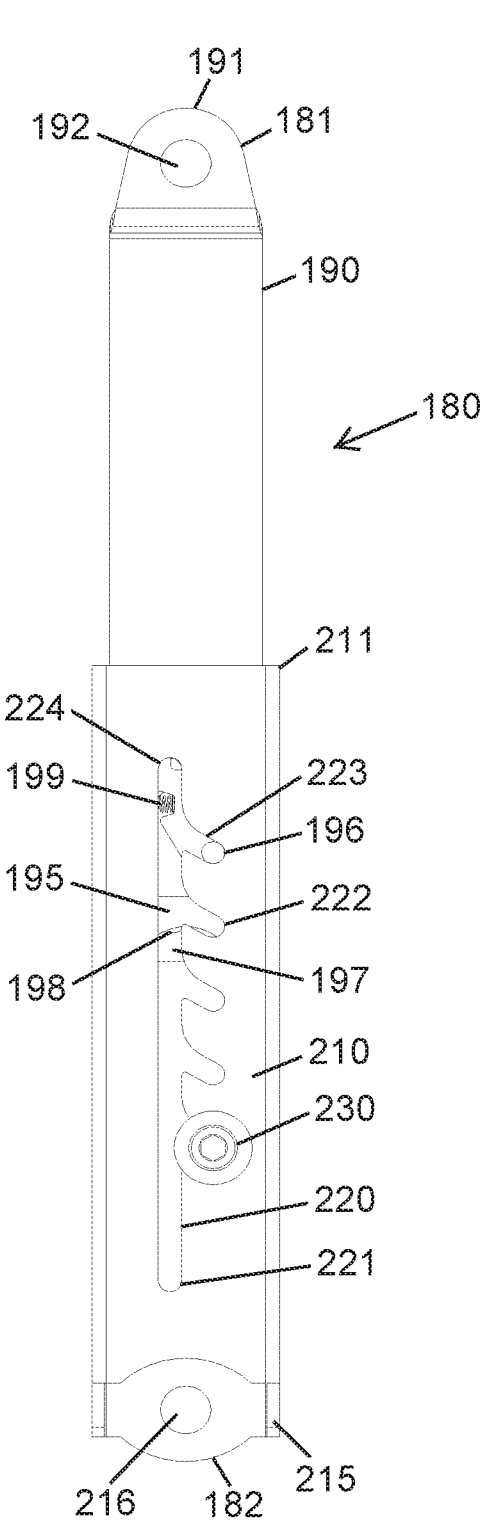
FIG. 25 is similar to FIG. 22, but shows the bar in an upper angled slot allowing the table to be in the high transport position.
Figure 26:
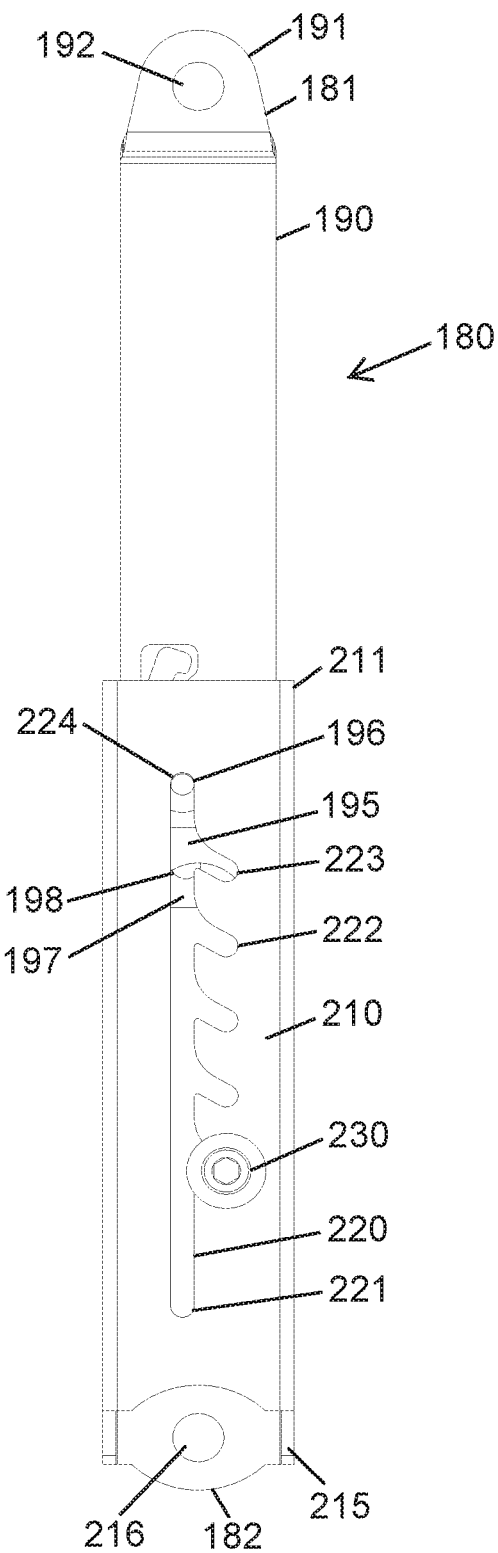
FIG. 26 is similar to FIG. 22, but shows the bar in an upper vertical position allowing the table to be reset to the grounded position.

The second piece 210 is extendable and retractable relative to the first piece 190. The first piece is fully retraced when the rod 196 is in the lower vertical slot, as seen in FIG. 22. The first piece 190 can be locked into a first extended position as seen in FIG. 24 by separating the first piece 190 from the second piece 210 a selected distance wherein the rod 196 will travel relative to the rail 220 until the spring 199 biases the rod 196 into the lower angled slot. If extension of the first piece 190 ceases, the rod 196 rests in the lower angled slot to prevent retraction of the first piece 190 relative to the second piece 210. Because the lower angled slot is angled, further extension is allowed by extending the first piece 190 further from the second piece 210. The first piece 190 can be locked into a second extended position as seen in FIG. 25 by separating the first piece 190 from the second piece 210 a further selected distance wherein the rod 196 will travel relative to the rail 220 until the spring 199 biases the rod 196 into the upper angled slot. If extension of the first piece 190 ceases, the rod 196 rests in the upper angled slot to prevent retraction of the first piece 190 relative to the second piece 210. Because the upper angled slot is angled, further extension is allowed by extending the first piece 190 further from the second piece 210. The first piece 190 can be fully extended relative to the second piece 210 to reset the extension assembly 180 as seen in FIG. 26. This occurs when the rod 196 enters the upper vertical slot 224. The extension assembly 180 can then be moved to the retracted position by inserting the first piece 190 into the second piece 210. The rod 196 enters the slot 198 of the guide 197 when the first piece 190 is moved in this direction. The spring 199 cannot move the rod 196 when the rod is received within the slot 197. In this regard, the rod 196 cannot enter either of the angled slots 222 and 223 when the extension assembly is being reset.

As seen in FIG. 23, a stop bolt 230 can be used to limit downward travel of the second piece 210 relative to the first piece 190 and therefore limit the number of transport positions. In a preferred embodiment, when the stop bolt is placed in the lowermost angled slot, only two of the angled slots are operable to define transport positions. A low angled slot can receive the bar in this embodiment in the grounded position. A stop bolt is shown in FIGS. 13-16.

Without the stop bolt 230, up to five possible transport positions are possible with the illustrated component. This allows for flexibility in aftermarket installations where there is some variability in table base design and the end user needs to compensate for proper height in the grounded and transport positions.

The upper end 181 of the extension assembly 180 is connected to the bottom 22 of the base 20 via hole 192. The lower end of the extension assembly is connected to the top 141 of the caster assembly via hole 216. In this regard, it is understood that the caster assembly 140 can be moved vertically relative to the base 20.

Figure 2:
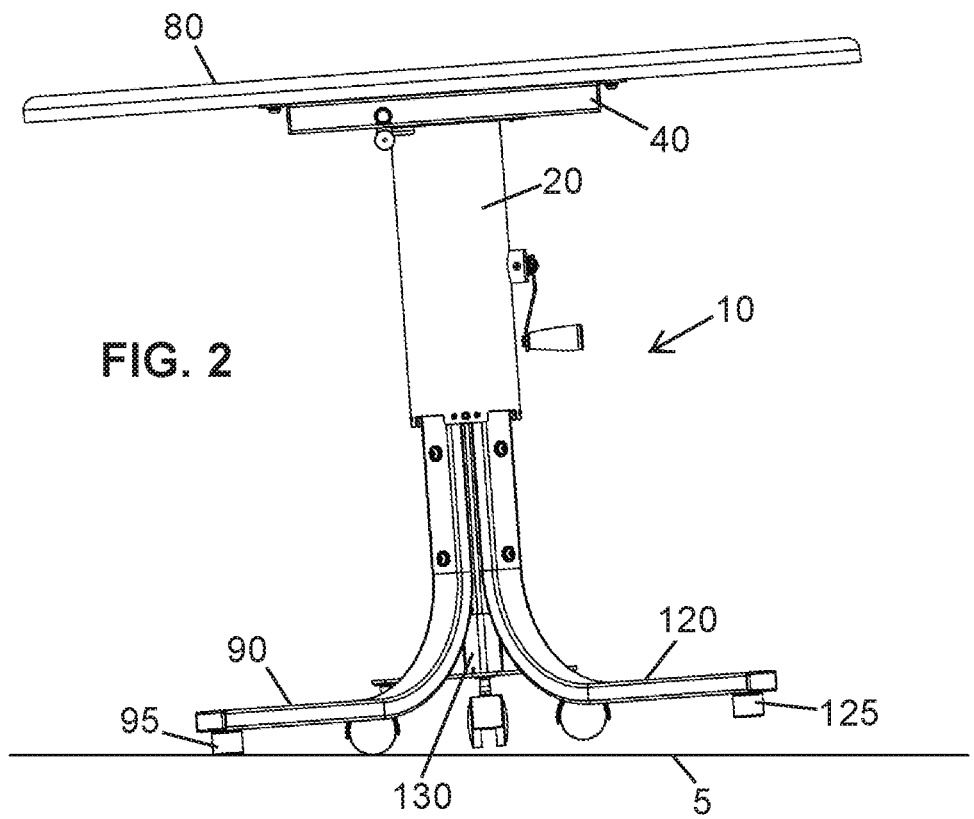
FIG. 2 is a side view showing one side of the table being lifted a sufficient amount so that an extension assembly deploys so that the table can be placed in a low transport position.
Figure 3:
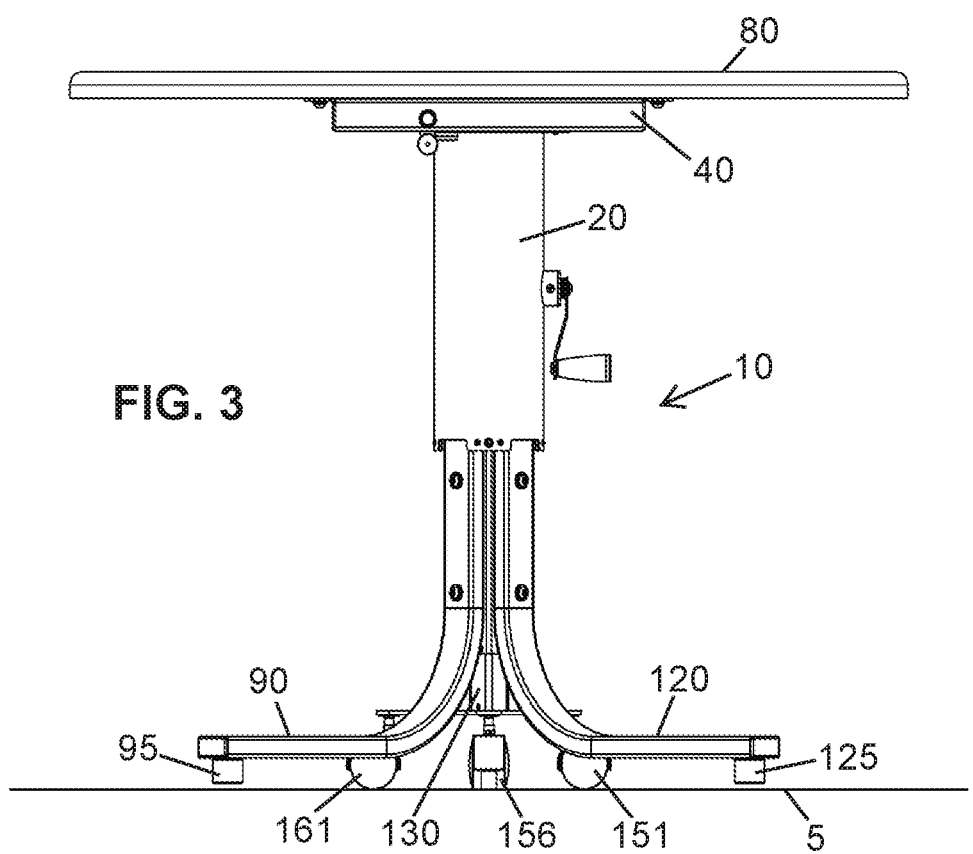
FIG. 3 is a side view of the table in the low transport position.
Figure 4:
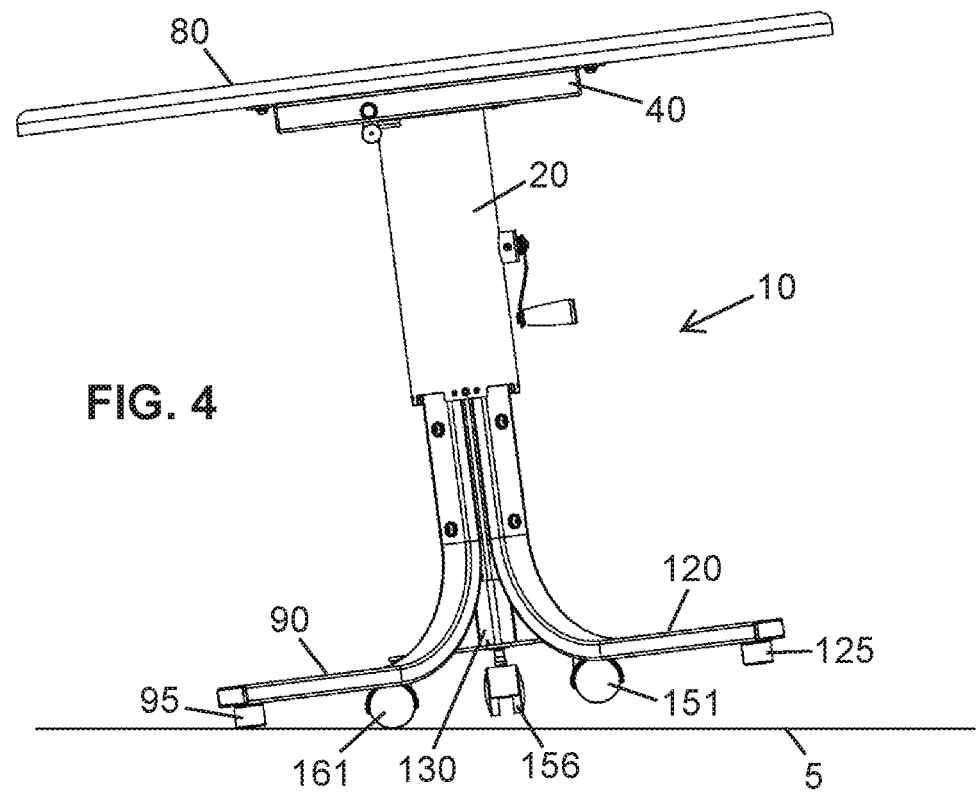
FIG. 4 is a side view showing one side of the table being lifted a sufficient amount so that an extension assembly deploys so that the table can be placed in a high transport position.
Figure 5:
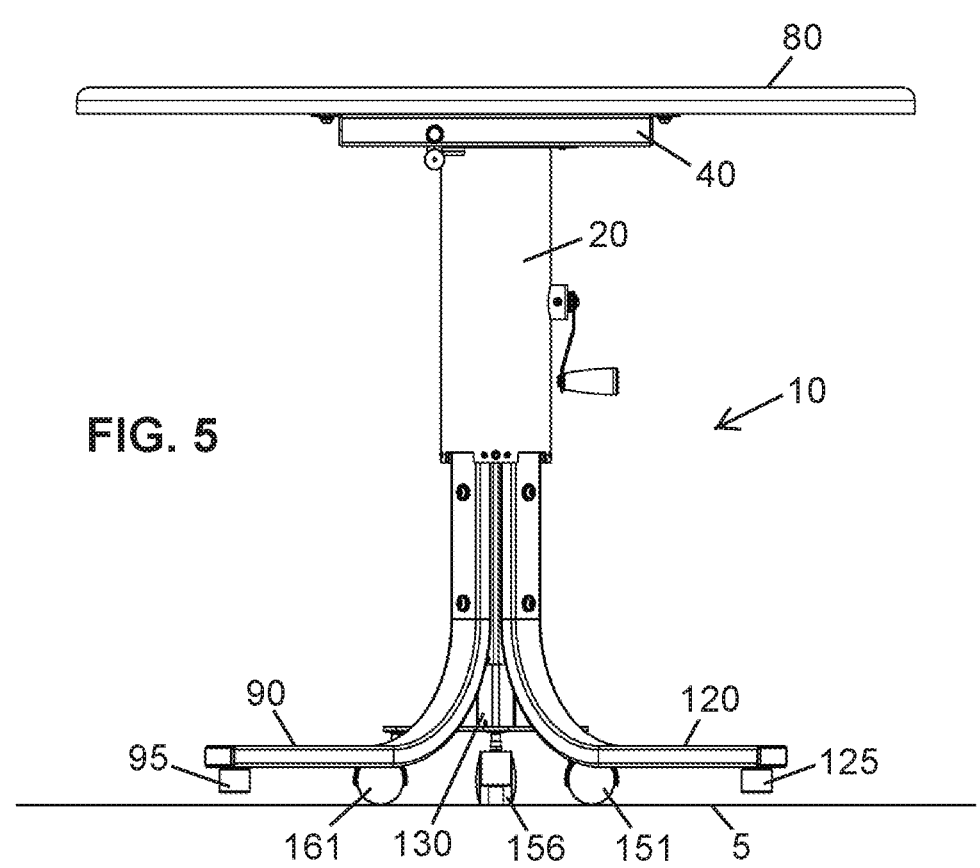
FIG. 5 is a side view of the table in the high transport position.
Figure 6:
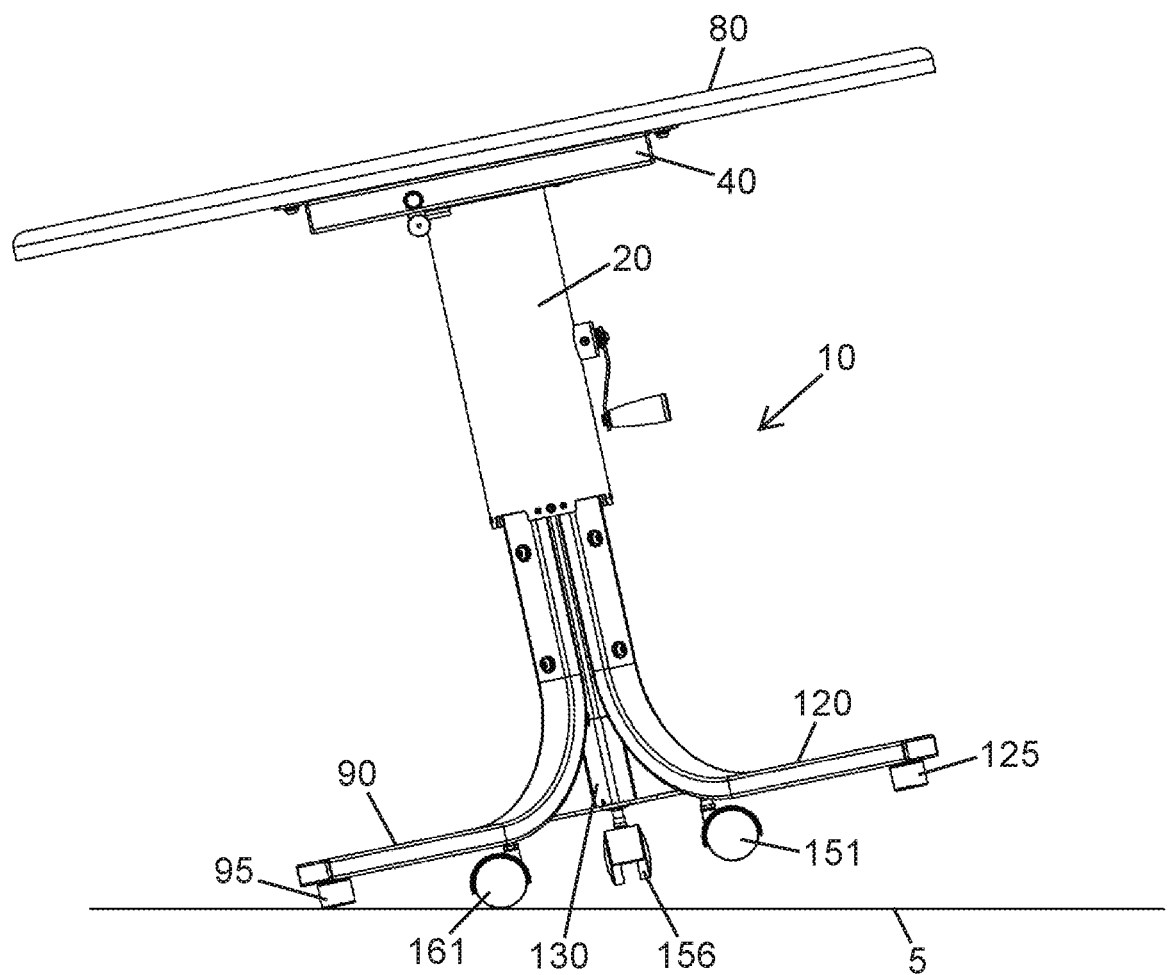
FIG. 6 is a side view showing one side of the table being lifted a sufficient amount so that an extension assembly resets so that the table can be returned to the grounded position.

The table can have a grounded position (FIG. 1), a low transport position (FIG. 3) and a high transport position (FIG. 5). In the grounded position, the weight of the table 10 rests completely on the pads of the respective legs as seen in FIG. 1. The transport mechanism 130 is fully retracted in the grounded position. It is appreciated that the casters are shown on the floor due to the force of gravity but they are not bearing any table weight in this position. The table can be tilted to move the table to the low transport position as seen in FIG. 2. To accomplish this, the table 10 can be tilted approximately two to three inches (approximately five to seven degrees) about the base axis from anywhere about the perimeter 83 of the table so that the rod 196 can enter the lower angled slot and an audible click can be heard. The weight of the table can now be supported by the casters. The low transport position is useful when moving the table on a hard surface. The table can be tilted further as seen in FIG. 4 to move the table to the high transport position. To accomplish this, the table 10 can be tilted approximately three and a half inches to five inches (approximately eight to ten degrees) about the base axis from anywhere about the perimeter 83 of the table so that the rod 196 can enter the upper angled slot and an audible click can be heard. The weight of the table is supported by the casters as in the low transport position, albeit with the pads higher off of the surface 5. The high transport position is useful when moving the table on a soft surface. The table 10 can be further tilted as seen in FIG. 6 to reset the transport mechanism 130 so that the table is again supported by the pads. To accomplish this, the table 10 can be tilted approximately six or more inches (approximately 12 degrees or greater) about the base axis from anywhere about the perimeter 83 of the table so that the rod 196 can enter the upper vertical slot. The rod is then laterally immobilized while the extension assembly is retracting until the rod 196 again is positioned in the lower vertical slot 221.

Figure 7:
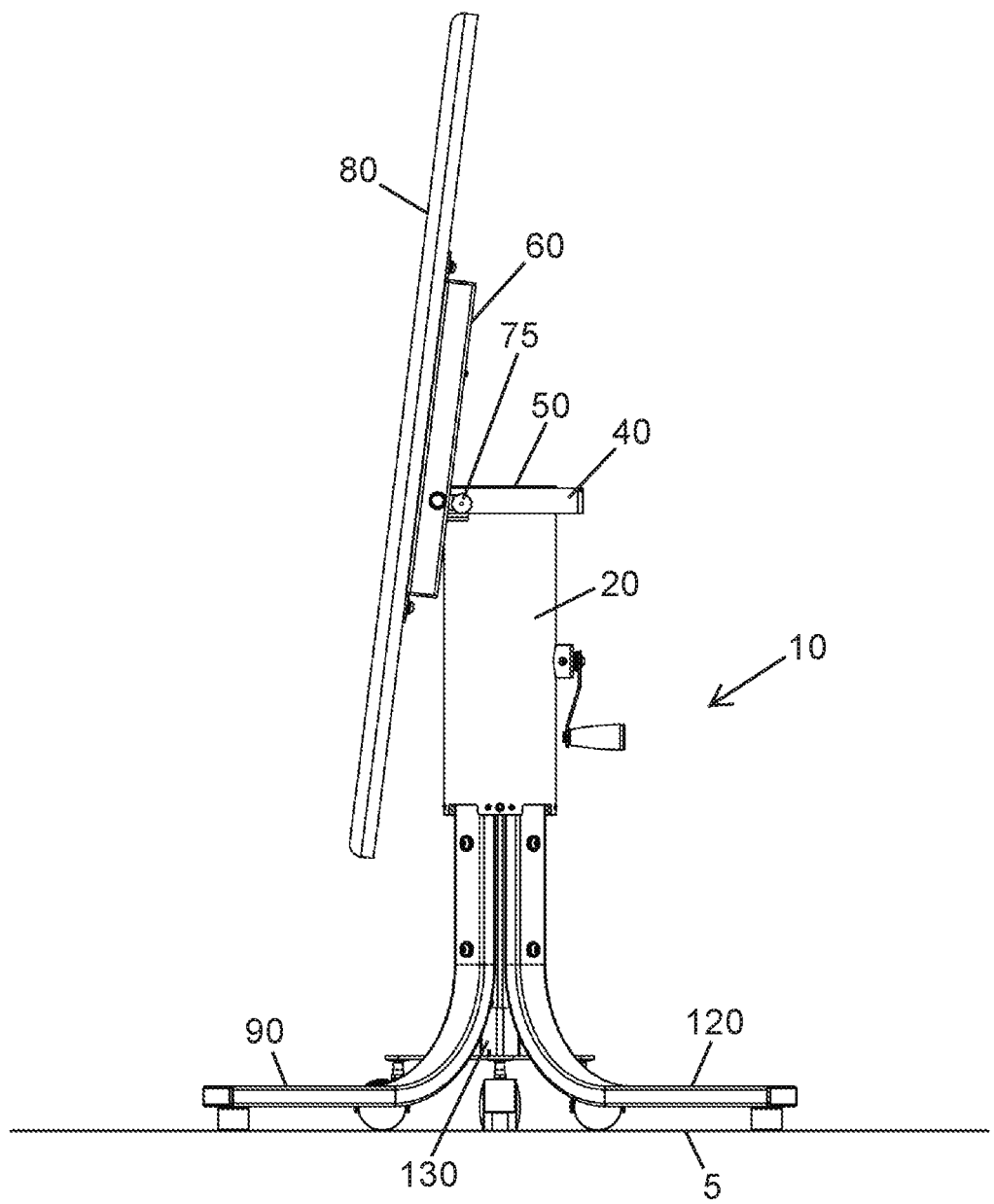
FIG. 7 is a side view similar to FIG. 1, but shows the table top moved to a vertical position.
Figure 8:
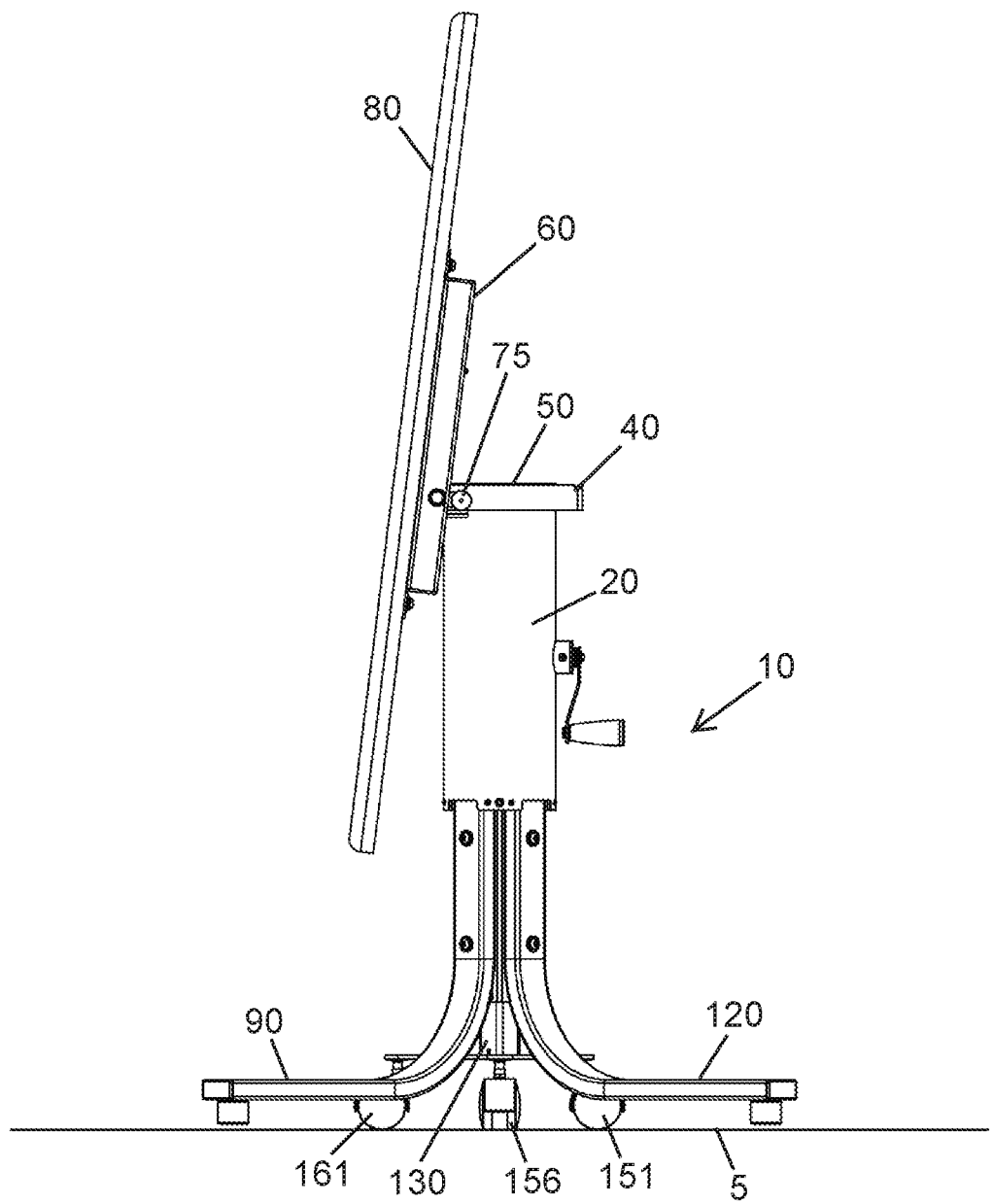
FIG. 8 is similar to FIG. 7, but shows the table in a low transport position instead of a grounded position.
Figure 9:
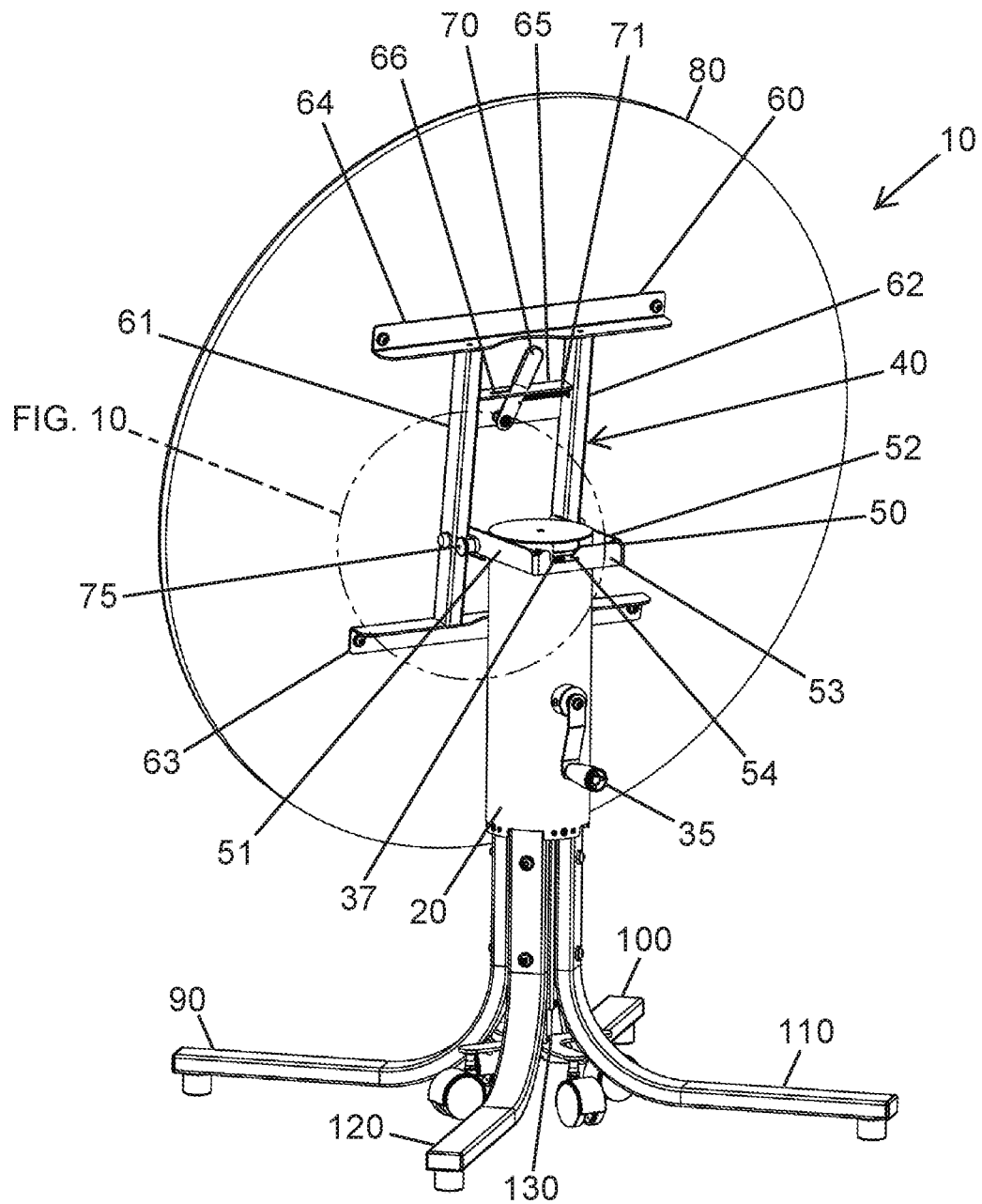
FIG. 9 is a perspective view showing the table top in the vertical position.
Figure 10:
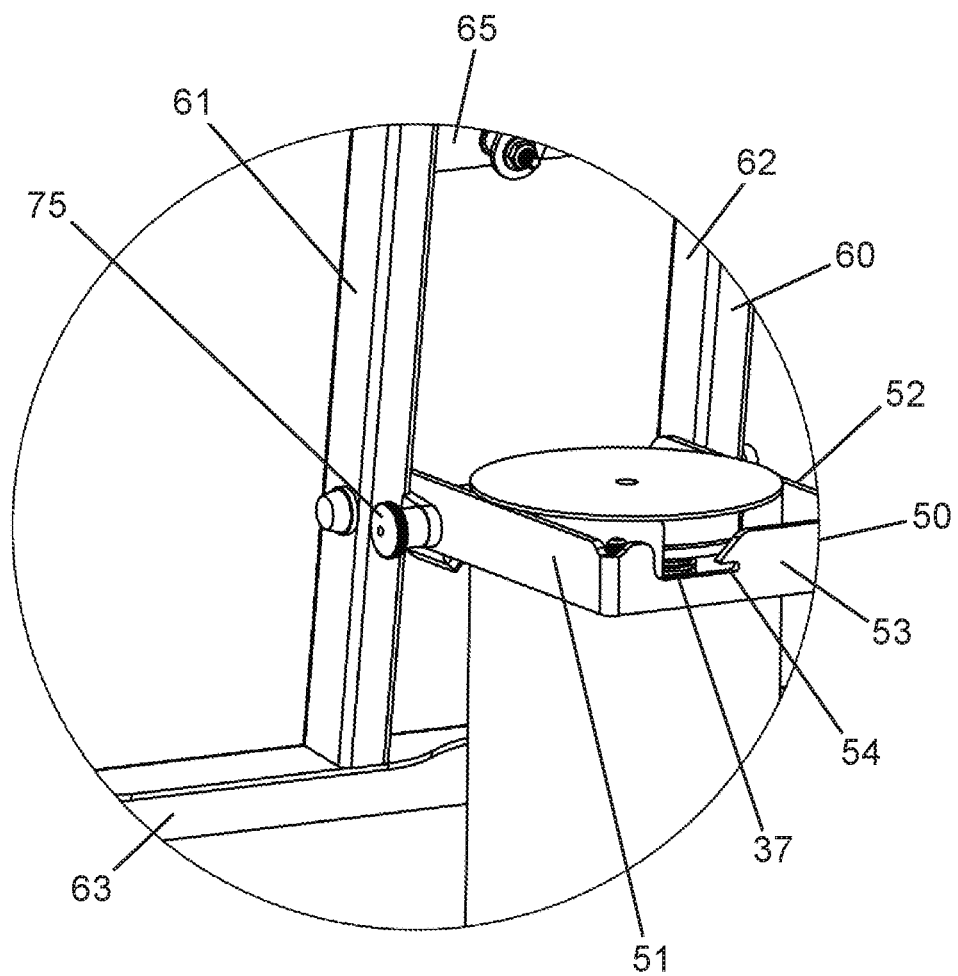
FIG. 10 is a close up view of a portion illustrated in FIG. 9.
Figure 11:
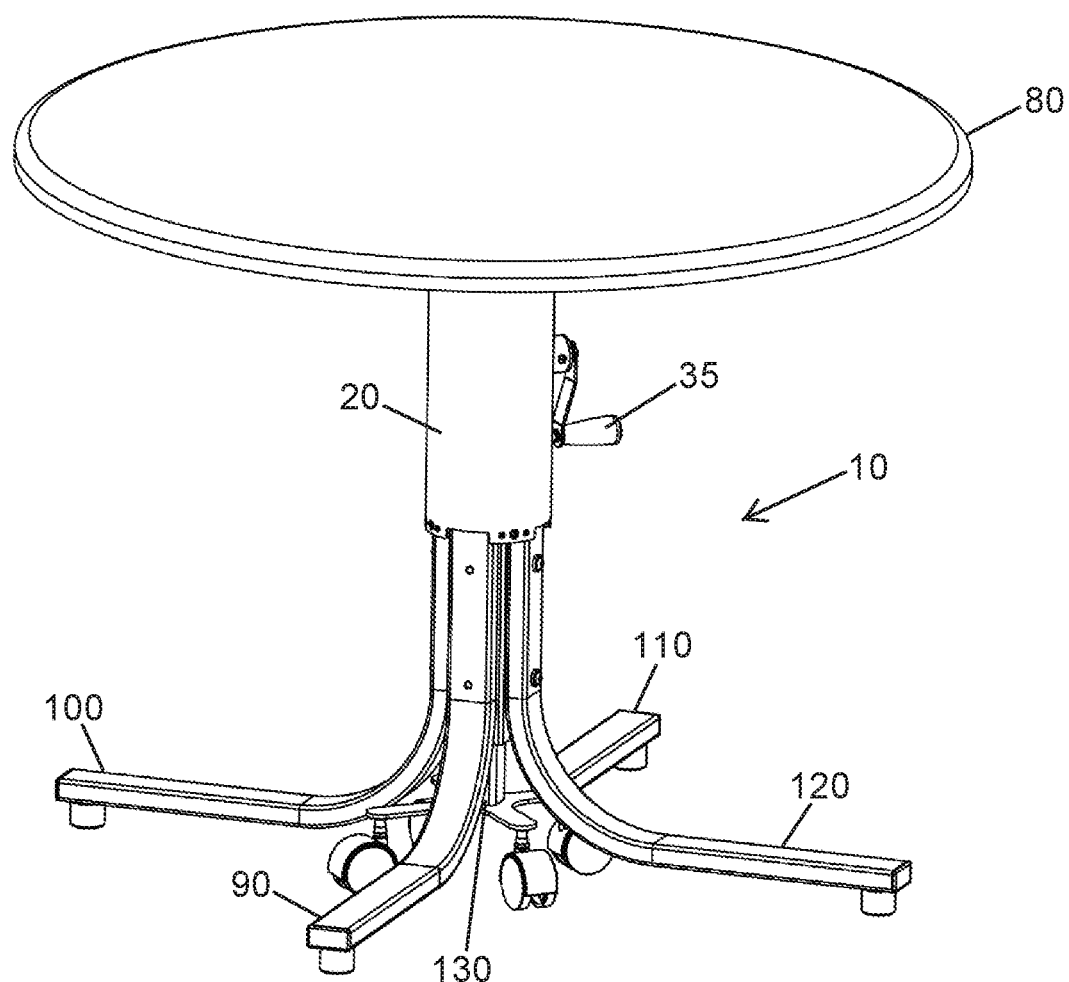
FIG. 11 is a perspective view showing the table top in the horizontal position.
Figure 12:
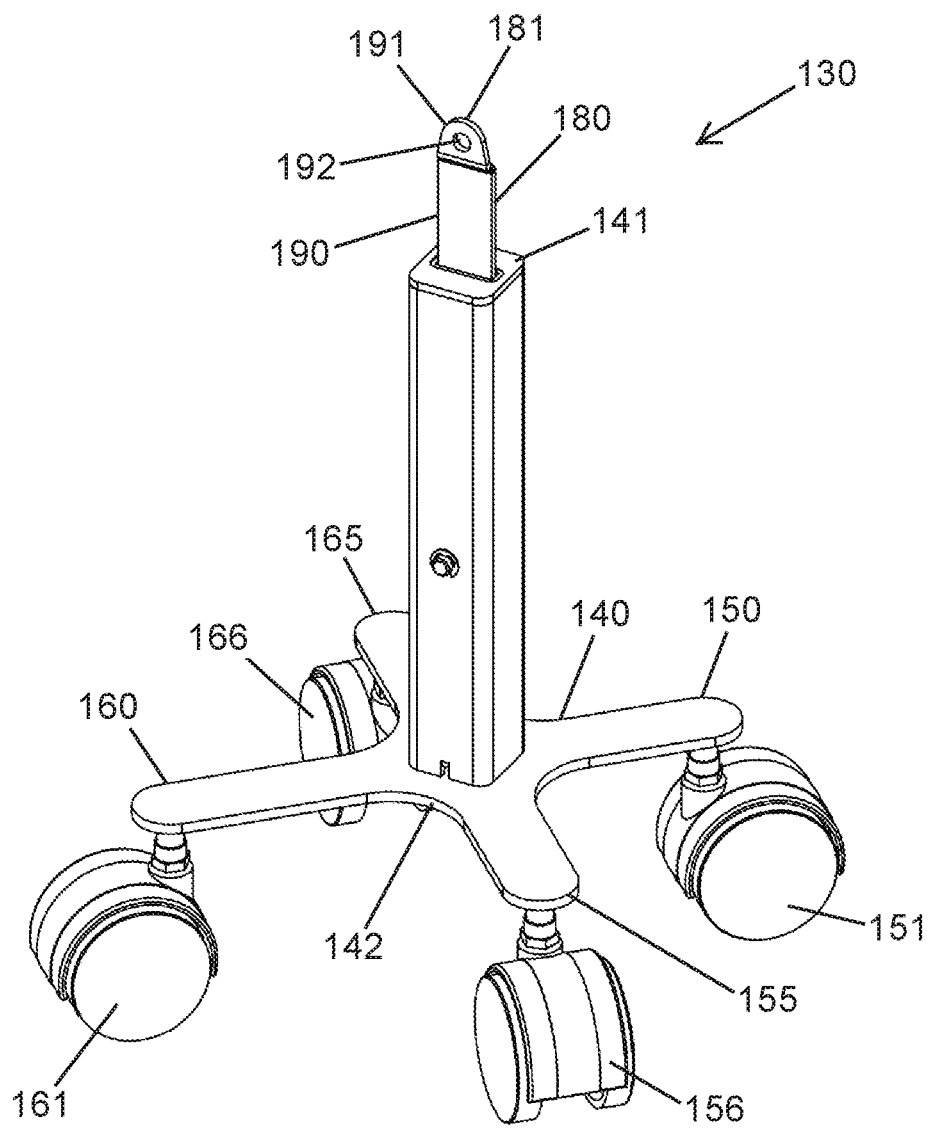
FIG. 12 is a perspective isolation view showing a preferred embodiment of the transport mechanism.
Figure 13:
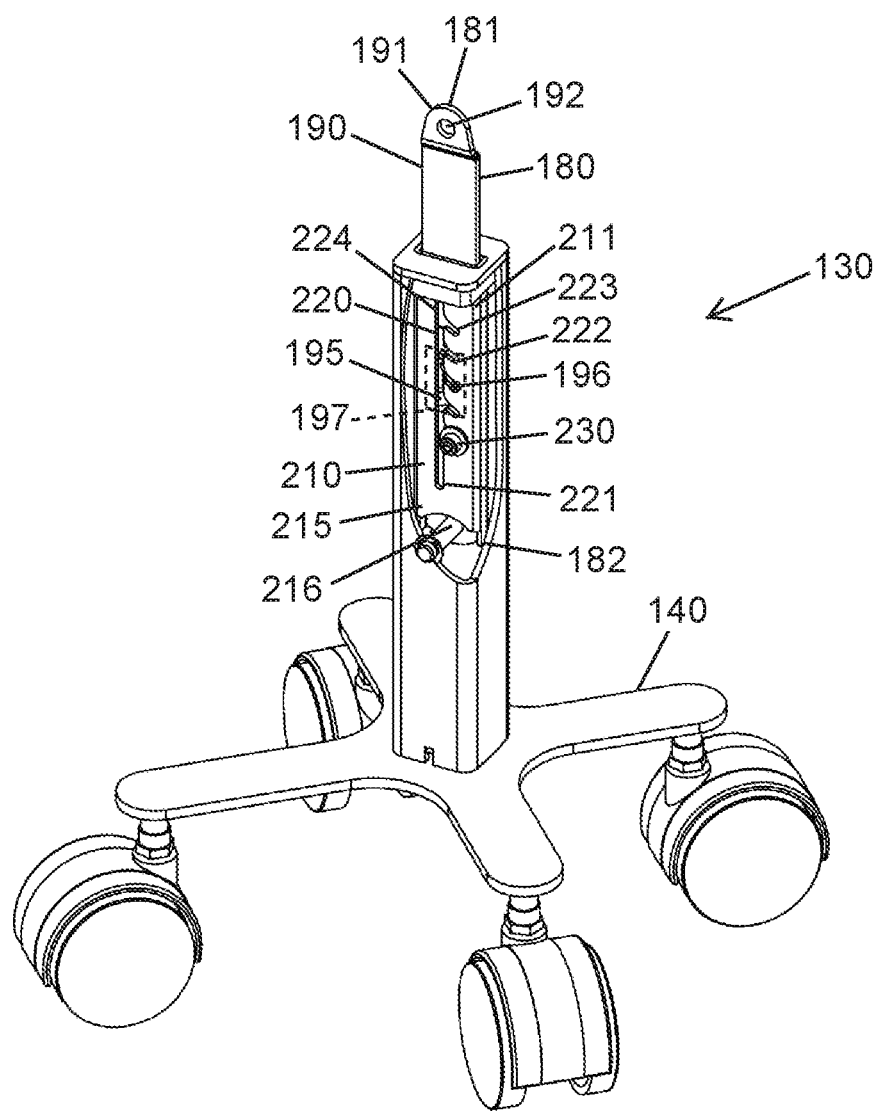
FIG. 13 is a perspective view of the transport assembly showing a position of the extension assembly that results in the table being in the grounded position.
Figure 14:
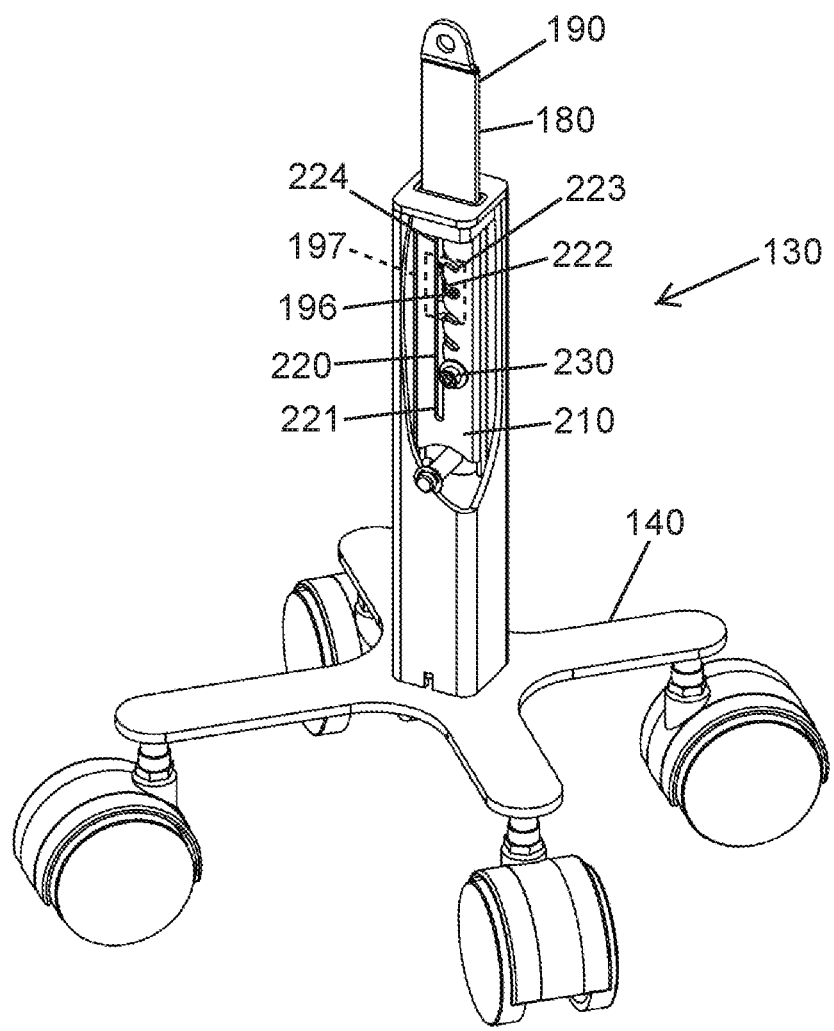
FIG. 14 is a perspective view of the transport assembly showing a position of the extension assembly that results in the table being in the low transport position.
Figure 15:
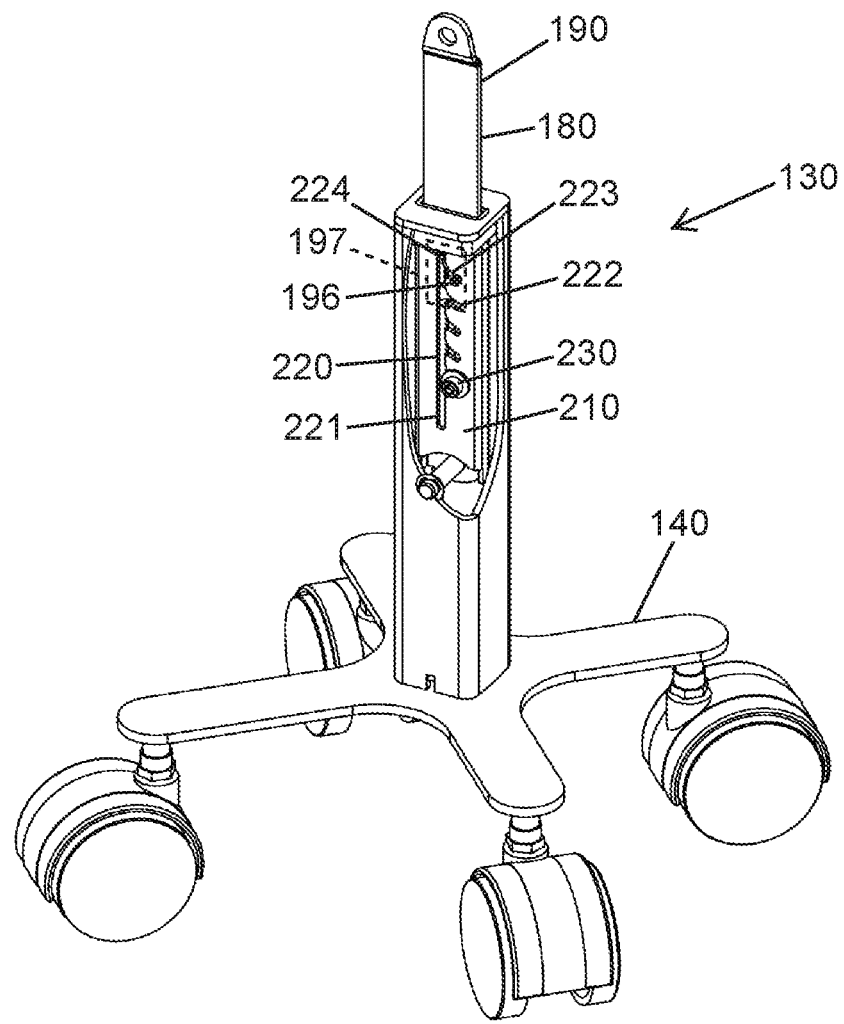
FIG. 15 is a perspective view of the transport assembly showing a position of the extension assembly that results in the table being in the high transport position.
Figure 16:
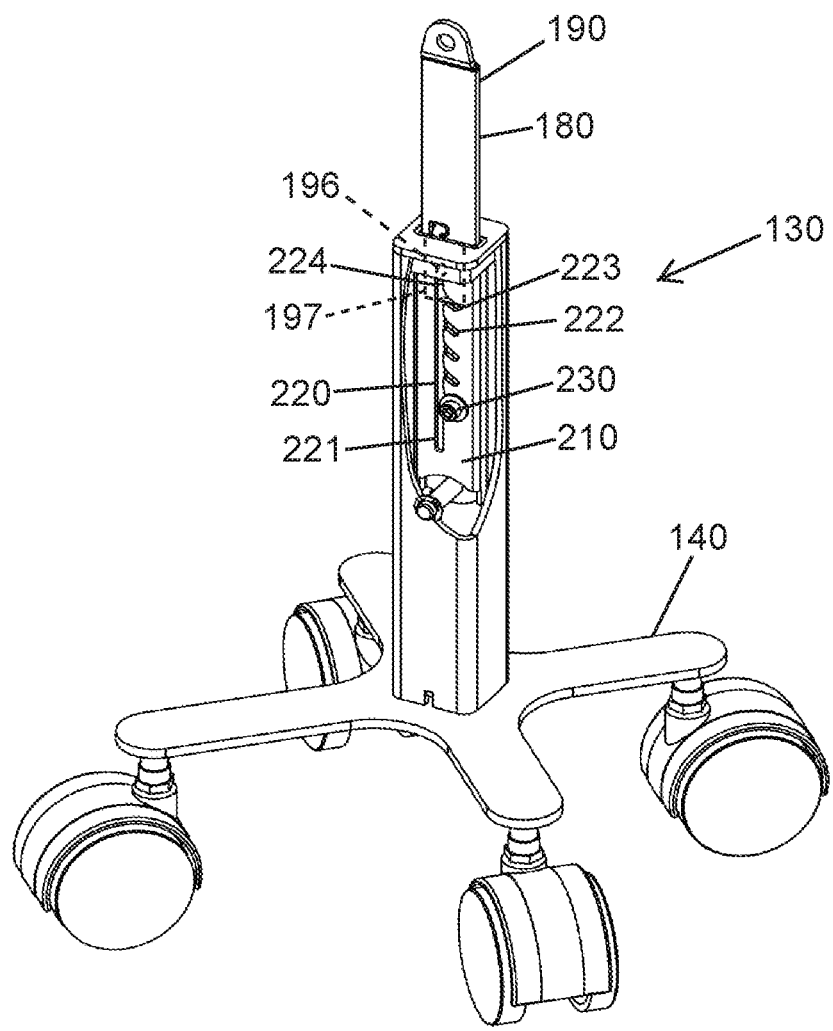
FIG. 16 is a perspective view of the transport assembly showing a position of the extension assembly that results in the table being reset to the grounded position.
Figure 17:
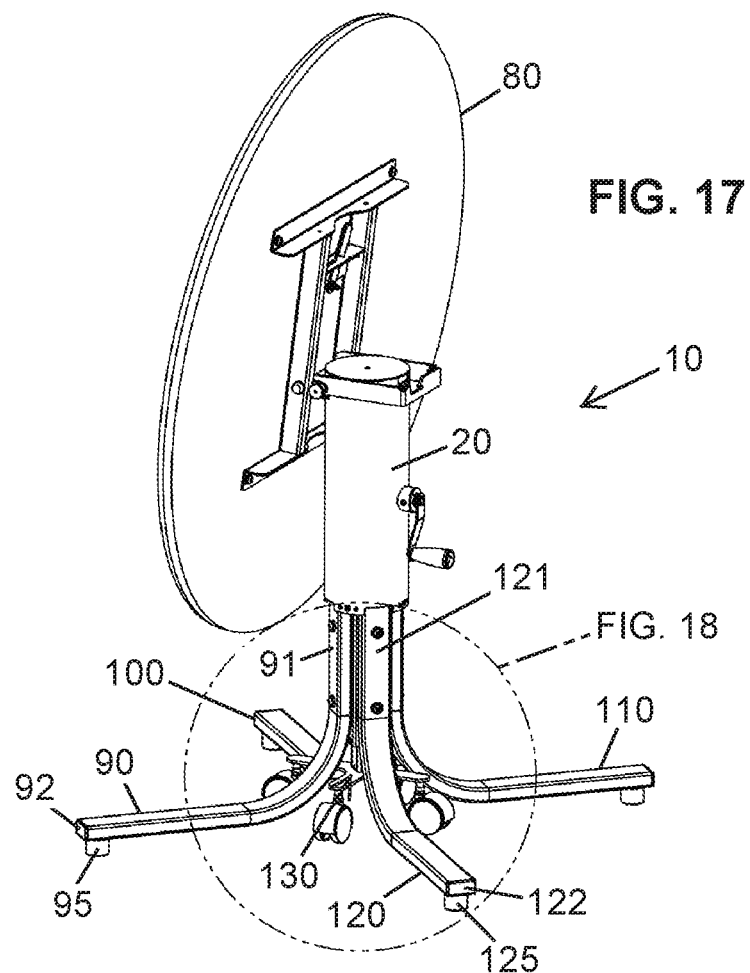
FIG. 17 is a perspective view showing the table in the vertical position.
Figure 18:
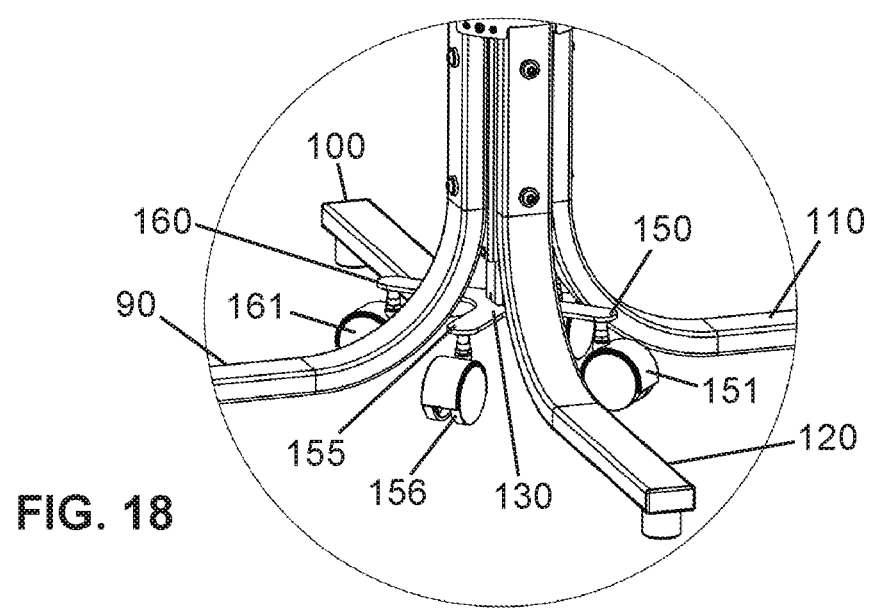
FIG. 18 is a close up perspective view showing a portion of FIG. 17.
Figure 19:
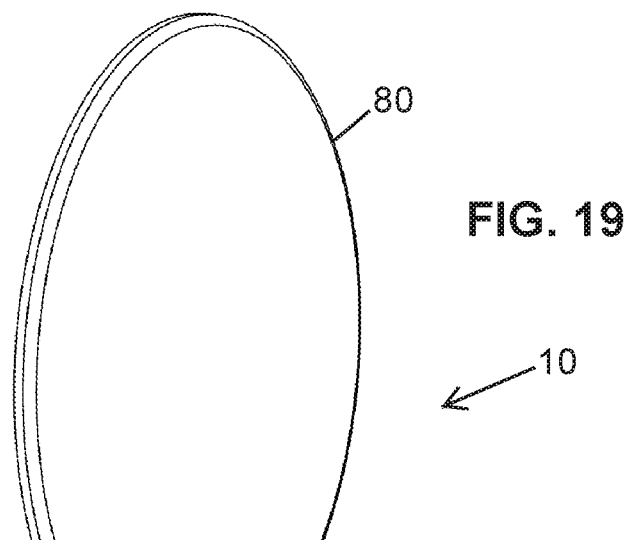
FIG. 19 is an alternative perspective view showing the table in the vertical position.
Figure 19:
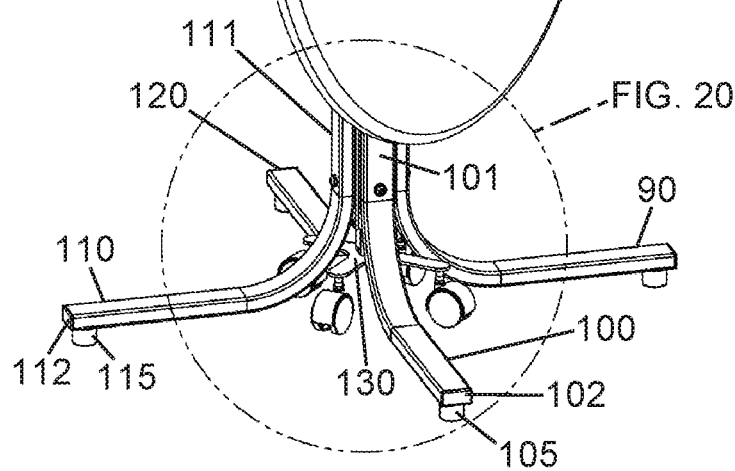
Figure 20:
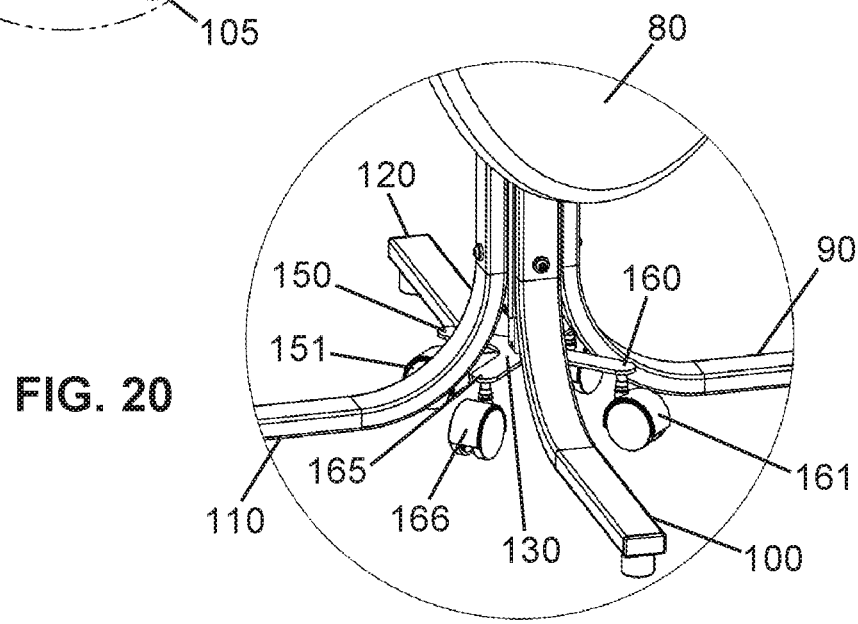
FIG. 20 is a close up perspective view showing a portion of FIG. 19.
Figure 21:
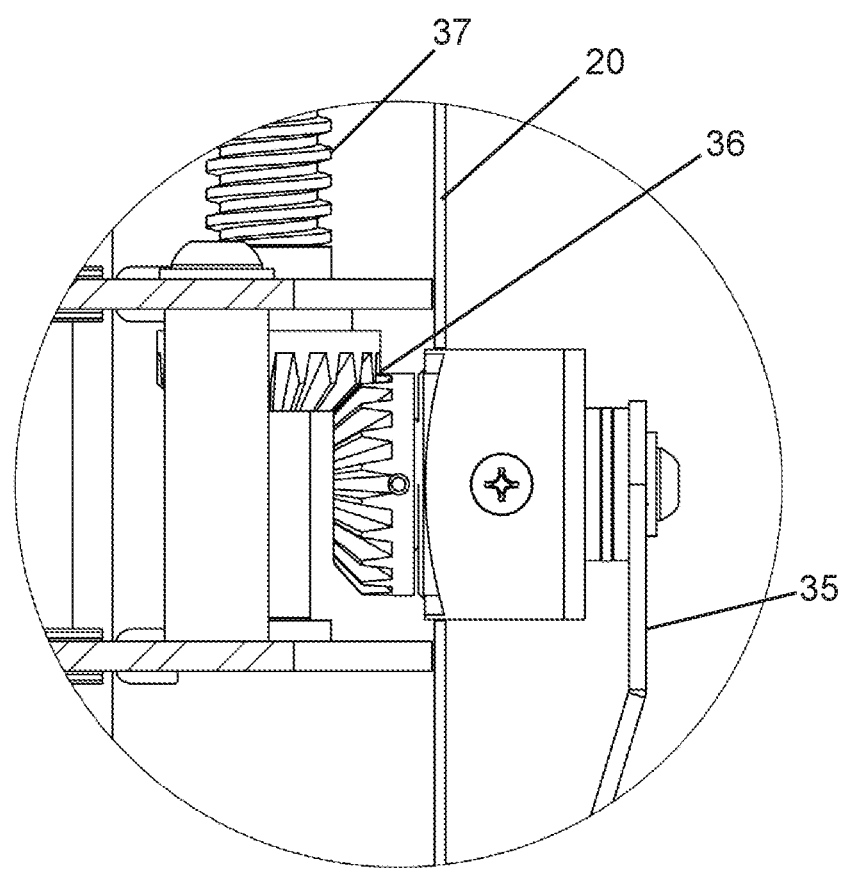
FIG. 21 is a view showing an interior of the base specifically showing the gear and vertical threaded shaft.

The table 10 be in a grounded position or transport position when the table top 80 is in the vertical position as seen in FIGS. 7 and 8.

It is appreciated that movement between the positions occurs automatically under the force of gravity simply by tilting the table a selected amount. Further, the tilting can occur from any direction radially about the table. Still further, the tilting can occur regardless of the position of the table top (horizontal or vertical).

Thus it is apparent that there has been provided, in accordance with the invention, an adjustable height table base with a transport mechanism that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A table comprising:
a base;
a table frame;
a table top having a perimeter;
at least one leg; and
a transport mechanism having a plurality of casters and being operable under operation of gravity between a grounded position and a transport position as said table top is lifted anywhere about said perimeter, wherein:
in said grounded position, said table is supported by said at least one leg; and
in said transport position, said table is supported by said plurality of casters; said transport position is a low transport position and said transport mechanism further has a high transport position, said transport mechanism has a first piece and a second piece; said first piece has a rod; and said second piece has a first slot and a second slot, said rod entering said first slot when said transport mechanism is in said low transport position, and said rod entering said second slot when said transport mechanism is in said high transport position.

2. The table of claim 1, wherein:
said at least one leg comprises at least three legs; and
each of said at least three legs has a pad.

3. The table of claim 1, wherein:
said transport mechanism comprises an extension assembly and a caster assembly;
said extension assembly is connected to said base and to said caster assembly;
said plurality of casters are supported by said caster assembly.

4. The table of claim 3, wherein said transport mechanism is operable by lifting said table top vertically.

5. The table of claim 4, wherein:
a user moves said table from a grounded position to said low transport position by lifting said table top between 5-7 degrees;
the user moves said table from said low transport position to said high transport position by lifting said table top between 8-10 degrees; and
the user resets the table to drop to the grounded position by lifting said table top at least 12 degrees.

6. The table of claim 1, wherein:
said table frame has a table frame first section and table frame second section;
said table frame first section is connected to said base;
said table frame second section is connected to said table top;
said table frame first section is pivotally connected to said table frame second section whereby said table top is tiltable between a horizontal position and a vertical position;
said table frame has a horizontal lock to lock said table top in said horizontal position and a vertical lock to lock said table top in said vertical position, whereby said table is transportable upon said plurality of casters in said transport position when said table top is locked in either of said horizontal position and said vertical position; and
said table top has a horizontal table top plane when said table top is horizontal, said plurality of casters lie in planes that are parallel to said horizontal table top plane in each of said grounded position and said transport position.

7. A transport mechanism usable with a table base of a table with a table top having a table top perimeter and lying in a table top plane, said transport mechanism comprising:
a caster assembly with a caster assembly top and a caster assembly bottom, said caster assembly supporting a plurality of casters at said caster assembly bottom; and an extension assembly, said extension assembly having a first end attachable to the table base and a second end attachable to the caster assembly, said extension assembly being operable under the force of gravity between a grounded position, a low transport position and a high transport position by lifting the table top anywhere about the table top perimeter, wherein said plurality of casters lie in planes that are parallel to said table top plane in each of said grounded position, said low transport position and said high transport position; said extension assembly has a first piece and a second piece, said second piece being extendable and retractable relative to said first piece; said first piece has a rod; and said second piece has a first slot and a second slot, said rod entering said first slot when said transport mechanism is in said low transport position, and said rod entering said second slot when said transport mechanism is in said high transport position.

8. The transport mechanism of claim 7, wherein said plurality of casters is at least three castors.

9. A table comprising:
a base;
a plurality of legs;
a table top, said table top having a table top perimeter and being tiltable between a horizontal position and a vertical position on a table frame, said table top being lockable in said horizontal position and in said vertical position; and
a transport mechanism, said transport mechanism having a plurality of casters that are deployable under operation of gravity between a grounded position and at least one transport position by lifting said table top anywhere about said table top perimeter,
wherein:
said transport mechanism comprises an extension assembly and a caster assembly;
said extension assembly is connected to said base and to said caster assembly;
said plurality of casters are supported by said caster assembly
said table is supported by said plurality of legs when said table is in said grounded position, and
said table is supported by said plurality of casters both when said table is in said at least one transport position when said table top is in said horizontal position and in said vertical position; wherein said at least one transport position is a low transport position and said transport mechanism further has a high transport position, said transport mechanism has a first piece and a second piece; said first piece has a rod; and said second piece has a first slot and a second slot, said rod entering said first slot when said transport mechanism is in said low transport position, and said rod entering said second slot when said transport mechanism is in said high transport position.

10. The table of claim 9, wherein:
said plurality of legs comprises at least three legs; and
each of said at least three legs has a pad.

11. The table of claim 9, wherein:
a user moves said table from said grounded position to said low transport position by lifting said table top between 5-7 degrees;
the user moves said table from said low transport position to said high transport position by lifting said table top between 8-10 degrees; and
the user resets the table to drop to the grounded position by lifting said table top at least 12 degrees.

12. The table of claim 9, wherein:
said table has a table frame with a table frame first section and table frame second section;
said table frame first section is connected to said base;
said table frame second section is connected to said table top;
said table frame first section is pivotally connected to said table frame second section about a pivot axis allowing said table top to be tiltable between said horizontal position and said vertical position;
said table frame has a first section with a slot and a second section with a lever the table top being locked in said horizontal position when said lever is received within said slot; and
said table frame further has a lock plunger that locks the table top in said vertical position.

13. The table of claim 12, wherein:
said pivot axis is offset from a center axis of said base when said table top is tilted to said vertical position;
one of said plurality of casters is connected to an elongated caster support to account for said offset.

14. The table of claim 9 wherein said table top is angled 83 degrees with respect to a floor when said table top is in said vertical position.

* * * * *